(12) United States Patent
Franke et al.

(10) Patent No.: US 10,564,005 B2
(45) Date of Patent: Feb. 18, 2020

(54) POSITION DETERMINING SENSOR UNIT

(71) Applicant: TDK—Micronas GmbH, Freiburg (DE)

(72) Inventors: Joerg Franke, Freiburg (DE); Klaus Heberle, Emmendingen (DE)

(73) Assignee: TDK-Micronas GmbH, Freiburg (DE)

( * ) Notice: Subject to any disclaimer, the term of this patent is extended or adjusted under 35 U.S.C. 154(b) by 413 days.

(21) Appl. No.: 15/449,505

(22) Filed: Mar. 3, 2017

(65) Prior Publication Data
US 2017/0254668 A1 Sep. 7, 2017

(30) Foreign Application Priority Data
Mar. 3, 2016 (DE) .......................... 10 2016 002 487

(51) Int. Cl.
*G01D 5/14* (2006.01)
*G01D 5/251* (2006.01)

(52) U.S. Cl.
CPC ............ *G01D 5/145* (2013.01); *G01D 5/2515* (2013.01)

(58) Field of Classification Search
CPC ............................. G01D 5/2515; G01D 5/145
USPC ........................................ 324/207.2, 207.24
See application file for complete search history.

(56) References Cited

U.S. PATENT DOCUMENTS

| | | | | |
|---|---|---|---|---|
| 4,367,506 A * | 1/1983 | Lapsker | ........... | G01R 19/16576 340/648 |
| 5,142,225 A * | 8/1992 | Gerlach | ................. | G01D 5/145 324/207.12 |
| 5,530,345 A * | 6/1996 | Murari | .................... | G01D 5/145 257/426 |
| 5,565,687 A * | 10/1996 | Berrill | .................... | G01D 5/145 250/577 |
| 5,594,335 A * | 1/1997 | Melbert | ................. | G01D 5/147 324/207.12 |
| 5,608,211 A * | 3/1997 | Hirono | .................... | G01B 11/24 250/234 |
| 5,925,943 A * | 7/1999 | Chitayat | ................ | G01D 5/145 310/12.15 |
| 5,929,631 A * | 7/1999 | Striker | ................... | G01D 5/145 324/207.21 |

(Continued)

FOREIGN PATENT DOCUMENTS

| | | |
|---|---|---|
| DE | 200 09 155 U1 | 9/2000 |
| DE | 11 2009 004 394 B4 | 12/2015 |
| WO | WO 2015/192965 A1 | 12/2015 |

*Primary Examiner* — Patrick Assouad
*Assistant Examiner* — Demetrius R Pretlow
(74) *Attorney, Agent, or Firm* — Muncy, Geissler, Olds & Lowe, P.C.

(57) ABSTRACT

A position determining sensor unit having a number of sensors arranged at predetermined positions along a path, and a transducer. The transducer has a first end which is moveable at least along the entire path, and a length running parallel to the path. Each sensor has a first supply voltage connection, a second supply voltage connection and a switching output, and wherein the switching output is switched into an On-state or an Off-state as a function of the threshold value of a sensor signal being exceeded or undershot. The supply voltage connection of each sensor is connected to a supply voltage, and a first sensor is arranged at a beginning of the path and a last sensor is arranged at an end of the path so that the second supply voltage connection of the first sensor is connected to a reference potential and the first sensor has a power consumption.

18 Claims, 2 Drawing Sheets

(56) References Cited

U.S. PATENT DOCUMENTS

| | | | | |
|---|---|---|---|---|
| 6,100,681 | A * | 8/2000 | Tsuruta | F16C 29/008 310/12.19 |
| 7,394,244 | B2 * | 7/2008 | Schley | G01D 5/252 324/207.2 |
| 7,535,216 | B2 * | 5/2009 | Speckmann | G01D 5/2451 324/207.15 |
| 8,122,159 | B2 | 2/2012 | Monreal | |
| 8,242,774 | B2 * | 8/2012 | Speckmann | G01D 5/20 324/207.15 |
| 8,823,193 | B1 * | 9/2014 | Yazghi | F03D 7/048 290/44 |
| 2003/0034774 | A1 * | 2/2003 | Pfeil | B60T 13/662 324/207.2 |
| 2006/0202737 | A1 * | 9/2006 | Walter | H03K 17/063 327/427 |
| 2008/0007255 | A1 * | 1/2008 | Johnson | G01D 5/145 324/207.24 |
| 2008/0068007 | A1 * | 3/2008 | Hoshiya | B82Y 25/00 324/207.21 |
| 2009/0224750 | A1 * | 9/2009 | Hosek | G01B 7/03 324/207.13 |
| 2010/0026369 | A1 * | 2/2010 | Hofmayer | G01D 3/08 327/379 |
| 2012/0136541 | A1 | 5/2012 | Inamoto | |
| 2013/0066587 | A1 * | 3/2013 | Kalathil | G01D 5/06 702/150 |
| 2015/0084619 | A1 * | 3/2015 | Stark | G01D 5/145 324/207.2 |
| 2015/0229255 | A1 * | 8/2015 | Wang | H02P 7/18 318/461 |
| 2017/0176215 | A1 * | 6/2017 | Yamagishi | G01D 5/145 |
| 2017/0254669 | A1 * | 9/2017 | Franke | G01D 5/2515 |
| 2018/0172475 | A1 * | 6/2018 | Quaas | G01D 3/08 |

* cited by examiner

POSITION DETERMINING SENSOR UNIT

This nonprovisional application claims priority under 35 U.S.C. § 119(a) to German Patent Application No. 10 2016 002 487.9, which was filed in Germany on Mar. 3, 2016, and which is herein incorporated by reference.

BACKGROUND OF THE INVENTION

Field of the Invention

The invention relates to a position determining sensor unit.

Description of the Background Art

A sensor unit for determining a linear position along a path is known from WO 2015/192965 A1. The sensor unit has a plurality of Hall switches arranged in a row along the path, a transducer movable above the row of Hall switches, a plurality of series-connected resistors and a voltage measuring unit, wherein each Hall switch switchably connects a voltage node lying between in each case two resistors with a reference potential. By means of the voltage drop determined by the voltage measurement unit, the position of the transducer is determined above the lined up Hall switches.

A master-slave system for several sensors is described in DE 11 2009 004 394 B4, which corresponds to U.S. Pat. No. 8,122,159, wherein the sensors are arranged in a so-called daisy-chain arrangement.

SUMMARY OF THE INVENTION

It is therefore an object of the invention to provide a device which develops the prior art.

According to an exemplary embodiment of the invention, a position determining sensor unit has a number of N, identical sensor units, which are arranged in rows at predetermined intervals at positions along a substantially straight or annular path, a transducer, and a current measuring unit.

The transducer has a first end that is movable at least along the path and a length extending parallel to the path from the first end.

Each sensor has a first supply voltage connection, a second supply voltage connection and a switching output, wherein the switching output is switched to an On-state or an Off-state as a function of a threshold value exceeding or falling below the sensor signal, and the first supply voltage connection of each sensor is connected to a first supply voltage. A first sensor is arranged at a beginning of the path and a last sensor at an end of the path.

The first sensor is connected by means of the second supply voltage connection to a second supply voltage, in particular to a ground potential, and has a power consumption Isup.

The second supply voltage connection of each further sensor Sn>1 is connected to the switching output of the preceding sensor Sn−1, wherein the respective sensor can be switched on or off by means of the switching output of the preceding sensor Sn−1 and has a power consumption Isup in the switched-on state.

In this way, the second supply voltage connection of the first sensor accommodates the entire current of the sensors switched on along the path.

By means of the switching output of the immediately preceding sensor, the respective further sensors can be switched on or off and each have a power consumption Isup in the switched-on state.

The current measuring unit is arranged before the first supply voltage connection of the first sensor or before the second supply voltage connection of the first sensor.

The power consumption Isup of all switched-on sensors contribute to an aggregate current Isum measured by means of the current measuring unit, wherein the aggregate current Isum is a multiple of the power consumption Isup and is proportional to a position of the first end of the transducer.

The cascade-like interconnection of the sensors is often referred to as a daisy chain. While the first sensor is always in the switched-on state when the position determining sensor unit is put into operation, the following sensor units in the daisy chain arrangement are switched on only on account of a threshold value exceeding the sensor signal of an immediately preceding sensor. The threshold value exceeding a sensor signal of a sensor is triggered by the transducer.

For determining the position, the fact is utilized that a switched-on sensor, unlike a switched-off sensor, has a non-zero power consumption. On the basis of measuring the total power consumption, herein referred to as aggregate current, the number of switched-on sensors, and thus the position of the transducer responsible for switching on, can be inferred.

An advantage of the device according to the invention is that there is no need to communicate with the individual sensors and that the output signals of the sensors do not need to be evaluated, but instead that the aggregate current in connection with the fixed positions of the sensors along the path already contain the information about the position of the transducer. This in particular eliminates the need for an elaborate circuit for address allocation and address output. A bus connection of the sensors is also redundant.

With the position determining unit according to an embodiment of the invention, path measurements are possible over long ranges, as are necessary, for example, for seat rails in cars or for a level indication in fuel tanks.

According to an embodiment, the On-state of the switching output of each sensor is switched when a first threshold value is exceeded, the Off-state of the switching output of each sensor is switched when the first threshold value falls short, and the length of the transducer extends from the first end at least to the first sensor S1, wherein a position of the first end of the transducer in the region of the position of the m-th sensor corresponds to an aggregate current Isum=(m+1)*Isup.

In the above-described non-inverting embodiment, the first sensor is always switched on, while all further sensors are switched on only if a threshold value of the sensor signal of an immediately preceding sensor is exceeded. If the first end of the transducer is moved beyond the first sensor, the sensor signal exceeds the first threshold value and switches on the immediately following sensor. If the first end of the transducer is moved further beyond the second sensor, then the immediately following third sensor is switched on, etc.

In order to be able to determine a position of the first end of the transducer, it must always be ensured in the non-inverting embodiment that the transducer has a sufficient length so that the transducer always extends from the first end at least beyond the first sensor when moving along the entire path, since said first sensor otherwise switches off all other sensors.

The position of the first end of the transducer can be set between a position 0 before the first sensor (switching output of the first sensor in the Off-state, Isum=1*Isup) and a position PN−1 of the penultimate sensor (switching output of the penultimate sensor in the On-state, Isum=N*Isup).

According to an embodiment for increasing the accuracy of the position determination, each sensor can have at least a first threshold value and a second threshold value, and the length of the transducer extends from the first end at least up to the first sensor S1, wherein the second threshold value is less than the first threshold value, the On-state of the switching output of each sensor is switched when the first threshold value is exceeded, the Off-state of the switching output of each sensor is switched when the second threshold value falls short, the On-state of the switching output of each sensor is pulse-width-modulated for sensor signals lying between the second threshold value and the first threshold value, a duty cycle of the pulse width modulation is proportional to the sensor signal, the power consumption Ipwm of a sensor connected to the pulse-width-modulated switching output is proportional to the duty cycle and less than the power consumption Isup in the On-state, and a position of the first end of the transducer in the region of the position of the m-th sensor Sm corresponds to an aggregate current Isum=m*Isup+Ipwm.

In order to ensure reliable imaging of the position by means of the pulse-width-modulated switching of a sensor, each sensor should achieve nominal power consumption in the shortest possible time. The time until nominal power consumption is reached should preferably be significantly below a period duration of the pulse width modulation. As a result, a sensor switched in a pulse-width-modulated manner by means of the switching output of the immediately preceding sensor has a power consumption Ipwm which is different from zero but is less than the power consumption Isup in the fully switched-on state. The power consumption Ipwm is proportional to the duration of the On-state of the pulse-width-modulated switching output, i.e. to the duty cycle of the pulse width modulation, wherein the duty cycle indicates the ratio of On-state to Off-state within a period of pulse width modulation. A sensor signal lying between the first and the second threshold value or the level of the sensor signal is mapped to the power consumption Ipwm via the duty cycle and can thus be determined by measuring the aggregate current.

In the pulse-width-modulated, non-inverting embodiment, the aggregate current includes an integer multiple of the power consumption Isup for all fully-switched sensors and, if appropriate, a portion Ipwm with 0<Ipwm<Isup of a pulse-width-modulated sensor. In addition to an absolute position provided by the integer multiple on a scale rasterized by the sensor intervals, a second position is obtained by means of the rest, wherein the second position contains relative position information on a finer scale.

For the evaluation, the PWM signal is, for example, converted into a linear current or voltage level via a low-pass filter, e.g. by means of a shunt resistor and can, for example, assume real values between 0 and 1 with a resolution of 8 to 16 bits. The relative position determined by means of the PWM signal is thus defined in an analog mode, while the first absolute position is determined in a digital mode (integer multiple).

Alternatively, the sensors are configured such that for sensor signals located between the first and second sensor signals, each sensor controls its own power consumption by pulse width modulation between Isup and 2*Isup, instead of switching the switching output in a pulse-width-modulated manner. As a result, the relative position of the first end of the transducer is mapped over an m-th sensor by pulse width modulation of the power consumption of the m-th sensor and not by the power consumption of the (m+1)-th sensor. However, nothing will change the further evaluation.

Instead of generating the additional current Ipwm by a pulse width modulation of the power consumption of the sensor, the current Ipwm, which represents the relative position, is provided in a further alternative embodiment by means of an analog output controlled by a digital-to-analog converter between Isup and 2*Isup.

In an embodiment, the Off-state of the switching output of each sensor is switched when a first threshold value is exceeded, the On-state of the switching output of each sensor is switched when the first threshold value falls short and the transducer extends from the first end at least along a partial area of the path in the direction of the last sensor, wherein a position of the first end of the transducer in the region of the position of the m-th sensor corresponds to an aggregate current Isum=m*Isup.

In the inverting embodiment, in the absence of the transducer, all sensors are switched on since a threshold value falls short for all sensor signals. The transducer causes the sensors to be switched off, wherein the transducer can have a short length in the inverting embodiment, the length extending from the first end in the direction of the last sensor. The length of the transducer must merely be sufficient to cause a threshold value to be exceeded within the sensor when the transducer is located above the sensor.

When the first end is above the first sensor, said first sensor detects an exceeding of the threshold value and the switching output of the first sensor is switched to the Off-state so that all subsequent sensors are switched off. If the first end of the transducer moves over the second sensor, the first sensor detects a threshold value falling short and switches on the immediately following second sensor. Thus, all successive sensors are always switched on from the first sensor to the sensor above which the first end of the transducer is located. The multiplier of the power consumption, which can be determined by means of the measured aggregate current, thus indicates the number of the sensor in the row of sensors arranged along the path and above which the first end of the transducer is located.

The position of the first end of the transducer can be set between a position 1 above the first sensor (switching output of the first sensor in the Off-state, Isum=1*Isup) and a position PN of the last sensor (switching output of the penultimate sensor in the On-state, Isum=N*Isup).

In an embodiment for increasing the accuracy of the position determination, each sensor can have at least a first threshold value and a second threshold value, and the transducer extends from the first end at least along a partial area of the path in the direction of the last sensor, wherein the second threshold value is less than the first threshold value, the Off-state of the switching output of each sensor is switched when the first threshold value is exceeded, the On-state of the switching output of each sensor is switched when the second threshold value falls short, the Off-state of the switching output of each sensor is switched in a pulse-width-modulated manner for sensor signals located between the first threshold value and the second threshold value, the duty cycle of the pulse width modulation is inversely proportional to the sensor signal, the power consumption Ipwm of a sensor connected to the pulse-width-modulated switching output is proportional to the duty cycle and less than the power consumption Isup in the On-state, a position of the first end of the transducer in the region of the position of the m-th sensor corresponds to an aggregate current Isum=(m−1)*Isup+Ipwm.

The embodiment described above represents an inverting, pulse-width-modulated embodiment, i.e. in the absence of the transducer, all sensors are switched on, and the transducer causes the sensors to be switched off, wherein a position within a region located above a sensor is resolved by means of the pulse width modulation. Correspondingly, the preceding embodiments apply with respect to a pulse width modulation of the signal output of the sensors and with respect to an inverted operation of the sensors.

According to an embodiment, the power consumption Isup of the sensors has a variance of at most 10% and/or the power consumption of each sensor is stabilized or trimmed in order to ensure a particularly reliable, error-free position determination. In a further embodiment, the intervals between sensors are the same for simplifying evaluation.

According to an embodiment, the first end of the transducer is designed as a tip or as an edge and/or a distance of the transducer from the path is constant along the entire length of the transducer or at least increases in the region of the first end. By means of a tapered first end or a first end bent away from the sensors, in particular the accuracy of the relative position determined by means of pulse width modulation can be increased within a region located above a single sensor, and an output characteristic can be linearized.

In an embodiment, the sensors can be magnetic field sensors, for example, Hall sensors with laterally or vertically measuring Hall plates. In combination with a transducer at least partially made of magnetic material, a particularly small and reliable positioning determining unit can be realized using magnetic field sensors, in particular, Hall sensors. Suitable magnetic field sensors are, for example, 3-wire Hall switches or 3-wire linear magnetic field sensors with a pulse width modulation output or magnetoresistive sensors. Hall sensors typically have one or two or three Hall plates which are preferably perpendicular to one another. In this case, the transducer is preferably made of a permanent magnetic material.

According to an embodiment, the switching output can have an open-drain transistor, wherein a current-carrying capacity of the open-drain output of the open drain transistor is preferably at least 100 mA and/or an input resistance of the open-drain transistor is preferably at most 100 mΩ. In order to ensure the input of all switched-on sensors into the aggregate current that is to be measured, even with a large number of sensors, the current-carrying capacity of the open-drain transistors of the sensors must be as great as possible. In order to be able to utilize as low a supply voltage as possible, even with a large number of sensors, the input resistance of the open-drain transistor must not be too high.

In an embodiment, the last sensor can be replaced by a resistor. A defined power level is achieved by adjusting the resistive value of the resistor to the supply voltage.

In an embodiment, the sensors for determining the position of the transducer can be capacitive sensors or inductive sensors.

In an embodiment, the sensors can be designed as temperature sensors, force sensors or pressure sensors, which, arranged in a row, measure the position of the transducer (solid state, liquid or gas) via its temperature, force or pressure input, or the position of a sulfur value of a temperature, force or pressure gradient is detected along the path.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
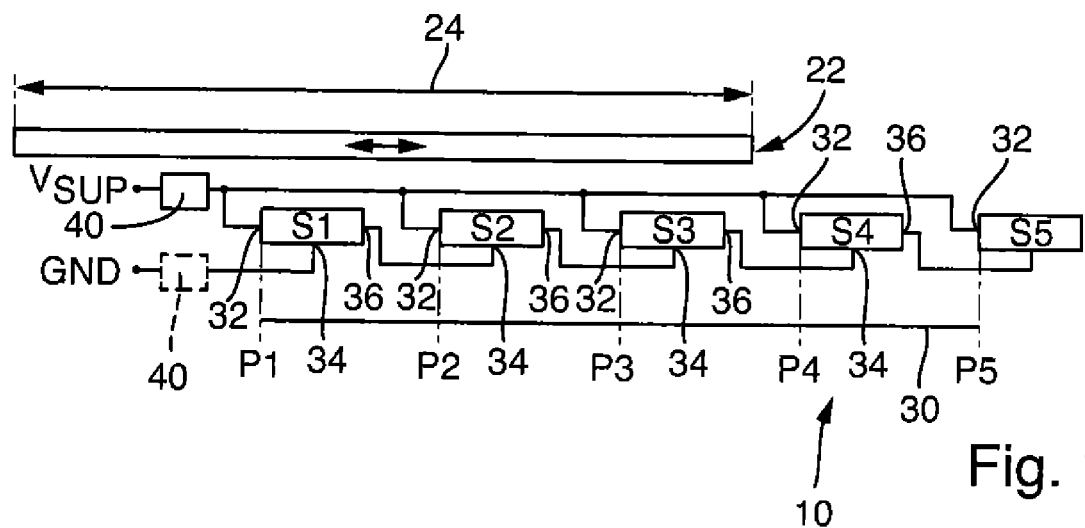
FIG. 1 is a schematic view of an embodiment of a position determining sensor unit according to the invention.

The diagram of FIG. 1 shows a schematic view of an inventive position determining sensor unit 10, comprising a number N=5 of identical sensor units Sn=1 . . . N, a transducer 20 and a current measuring unit 40.

The sensors are arranged along a path 30 at even intervals at positions Pn=1 . . . N, wherein a first sensor S1 is arranged at a beginning of the path and a last sensor SN is arranged at one end of the path 30.

Each sensor Sn has a first supply voltage connection 32, a second supply voltage connection 34 and a switching output 36, wherein the switching output 36 has an On-state and an Off-state. In the illustrated exemplary embodiment, as a function of a first threshold value, the switching output 36 of each sensor Sn switches to the On-state when a threshold value exceeds the sensor signal of the sensor Sn, and to the Off-state when the first threshold value falls short.

The first supply voltage connection 32 of the first sensor S1 is connected to a supply voltage Vsup, and the second supply voltage connection 34 of the first sensor S1 is connected to a reference potential GND, so that the first sensor S1 is always switched on during commissioning of the position determining sensor unit 10, therefore always having a power consumption Isup.

All further sensors Sn=2 . . . N are also connected by means of the respective first supply voltage connection 32 to the supply voltage Vsup. The second supply voltage connection 34 of the further sensors Sn=2 . . . N is connected in each case to the switching output 36 of the sensor Sn−1 immediately preceding along the path 30. As a result, the further sensors Sn=2 . . . N are switched on in each case by means of the immediately preceding sensor Sn−1, on the basis of exceeding the threshold value detected by the immediately preceding sensor. In the switched-on state, the further sensors Sn=2 . . . N also have a power consumption Isup, wherein the respective power consumption of all sensors Sn exhibits low variance due to the uniformity of the sensors.

To reduce costs, the last sensor SN can also be designed as a more cost-effective power consumer, e.g. as a resistor with a resistance value adapted to the supply voltages and without a connection corresponding to the switching output.

In the illustrated embodiment, the transducer 20 is a magnet, which has a first end 22 and a length 24. The transducer 20 is moveable parallel to the path 30, wherein the first end 22 can be moved along the entire path 30 and the length 24 of the magnet is greater than or equal to the path 30.

In the exemplary embodiment shown, the current measuring unit 40 is looped into the line of the first supply voltage Vsup, immediately before a first voltage node of the first sensor S1. Alternatively, the current measuring unit 40 can also be looped into the line for the reference potential GND before the second supply voltage connection 34—shown by dashed lines.

In both embodiments, an aggregate current Isum can be determined by means of the current measuring unit 40 in a simple manner, wherein the aggregate current is derived from the power consumption Isup of all switched-on sensors Sn. The aggregate current Isum thus corresponds to one multiple m of the power consumption Isup of a single sensor Sn:

$$I\text{sum}=m*I\text{sup}$$

In the illustrated exemplary embodiment, from the following equation using the measurable factor m, it is possible to determine over which sensor Sn the first end 22 of the transducer 20 is located:

$$n=m-1$$

Thus, the first end 22 is at the position Pm−1 of the (m−1)-th sensor Sm−1.

If the first end 22 of the transducer 20 is, as shown in the exemplary embodiment, above the third sensor S3, i.e., at the position P3 of the third sensor S3, then the transducer 20 covers the sensors S1, S2 and S3. The respective sensor signal for the sensors S1, S2, S3 is above the first threshold value; the respective switching output is switched to the On-state so that the sensors S1 to S4 are in the switched-on state. Only sensor S5 is still in a switched-off state. Thus, the four sensors contribute to the aggregate current Isum; the factor m is thus four.

To increase the accuracy of the position determination, according to a further development the sensors Sn=1 . . . N each have a second threshold value, the second threshold value being less than the first threshold value. When the first threshold value is exceeded, the switching output of each sensor is switched to the On-state; when the second threshold value falls short, the switching output is in each case switched to the Off-state.

For sensor signals located between the first threshold value and the second threshold value, the switching output is switched from the Off-state to the On-state in a pulse-width-modulated manner. The pulse width modulation has a duty cycle which is proportional to the sensor signal of the respective sensor.

The power consumption Ipwm of a sensor Sn switched in a pulse-width-modulated manner, i.e. of a sensor Sn which is connected to a pulse-width-modulated switching output of an immediately preceding sensor Sn−1, is less than the power consumption Isup of a fully switched-on sensor Sn.

Due to the proportionality of the duty cycle of the pulse width modulation to the sensor signal, the power consumption Ipwm of the pulse-width-modulated sensor is also proportional to the sensor signal, and thus proportional to the position of the first end 22 of the transducer in the region above the preceding sensor Sn−1. As a result, the position Pp of the first end 22 of the transducer 20 is more precisely resolved in the region of a single sensor.

When the first end 22 is located above the third sensor, as shown in FIG. 1, for the embodiment variant with pulse width modulation, the aggregate current Isum is composed of the power consumption Isup of the fully switched-on sensors S1, S2, S3 and the power consumption Ipwm of the sensor S4, since the sensor S4 is not switched on completely, but is switched on, accordingly pulse-width-modulated, by the pulse-width modulated switching output of the sensor S3. The sensor S5 does not contribute to the aggregate current Isum:

$$I=3*I\text{sup}+I\text{pwm}$$

Consequently, based on the multiple m of the power consumption Isup, here three, one can read off above which sensor Sn the first end 22 of the transducer is located. By mapping all possible values of the current Ipwm to a path corresponding to a width of a sensor along the path or to the distance between two sensors, and by determining the measured current Ipwm proportion of the width or path, the position of the first end 22 of the transducer 20 in the region of the third sensor can be more precisely determined.

Figure 2:
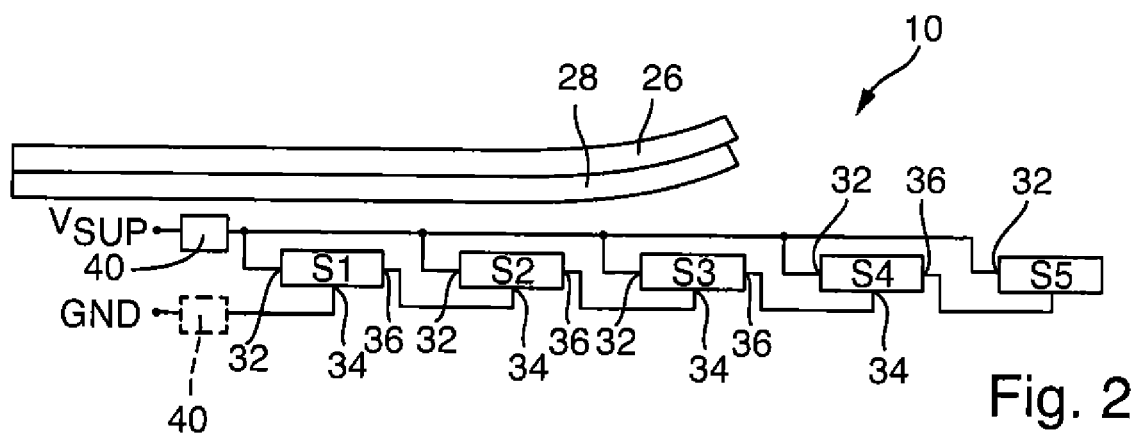
FIG. 2 is a schematic view of an embodiment of a position determining sensor unit according to the invention.
Figure 3:
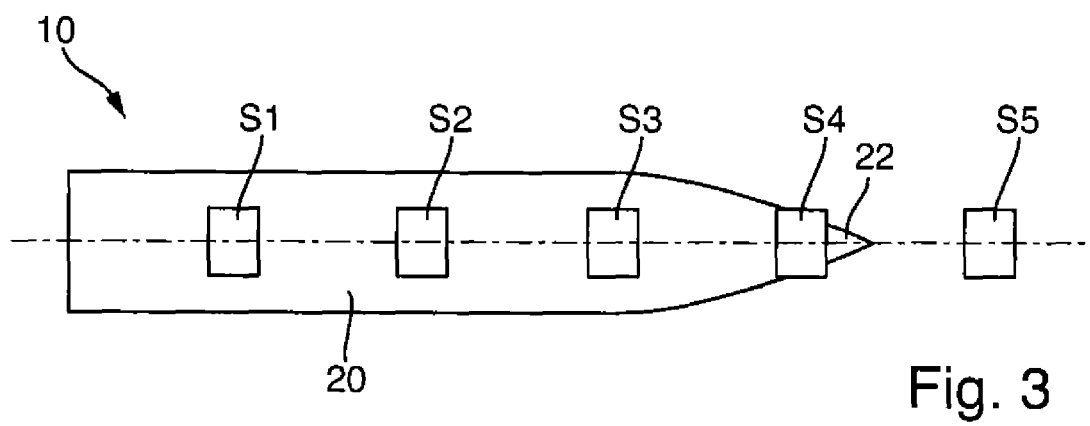
FIG. 3 is a schematic view of an embodiment of a position determining sensor unit according to the invention.

The illustrations of FIGS. 2 and 3 show advantageous embodiments of the embodiments shown in FIG. 1. In the following, only the differences from the illustration of FIG. 1 are explained. While the transducer 20 shown in FIG. 1 has a constant distance to the path 30 along the entire length 24 of the transducer 20, the distance of the transducer 20 shown in FIG. 2 increases in the direction of the first end 22, since the transducer 20 is bent in an area before the first end 22. Furthermore, in FIG. 2, the course of a first pole 26 and a second pole 28 is sketched within the transducer 20, which is designed as a magnet.

In FIG. 3, a position determining sensor unit 10 is sketched in a plan view. For better clarity, only the transducer 20 and the sensors Sn are shown. The transducer 20 shown in FIG. 3 has a tapering first end 22.

The embodiments of the first end 22 of the transducer 20 shown in FIGS. 2 and 3 make it possible to increase the accuracy of the position determination in a pulse-width-modulated operation.

Figure 4:
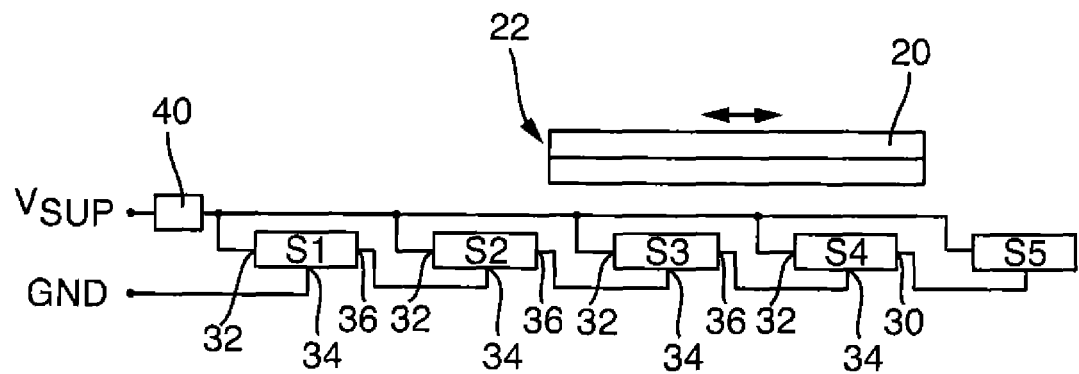
FIG. 4 is a schematic view of an embodiment of a position determining sensor unit according to the invention.

The diagram of FIG. 4 shows a further embodiment of a position determining sensor unit. In the following, only the differences from the illustration of FIG. 1 are explained. The illustrated sensors Sn are inverting, so that the switching outputs of the sensors each switch into the Off-state when the first threshold value is exceeded, and into the On-state, when the first threshold value falls short.

The transducer 20 extends from the first end 22 in the direction of the last sensor SN, wherein the length 24 of the transducer 20 covers only a partial region of the path 30.

In the absence of the transducer 20, all sensors Sn are in the switched-on state, since the first threshold value falls short for each sensor Sn and the output signal 36 is switched to the On-state.

If the first end 22 of the transducer is located in a region of an m-th sensor, e.g. as shown in the region of the third sensor S3, i.e. at the position P3, the sensor signal of the third sensor S3 exceeds the first threshold value, and the output signal 36 of the third sensor S3 is switched to the Off-state. As a result, all subsequent sensors S4, S5 are in the switched-off state and have no power consumption Isup. Only the power consumption Isup of the sensors S1 and S2 preceding along the path contributes to the aggregate current Isum. Thus, by means of the factor m of Isum=m*Isup, the sensor Sn or the position Pn of the sensor Sn, on which the first end 22 of the transducer 20 is located, can be determined as follows:

$$n=m$$

The pulse width modulation described with regard to the exemplary embodiment according to FIG. 1 and the embodiments of the first end of the transducer 20 described in FIGS. 2 and 3 for increasing the accuracy of the position determinations are equally possible in the inverted mode illustrated in FIG. 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A position determining sensor comprising:
a current measuring unit;
a plurality of sensors arranged at predetermined intervals at positions along a path, each of the plurality of sensors comprises a first supply voltage connection, a second supply voltage connection, and a switching output; and
a transducer that has a first end, which is at least movable along an entire path and a length extending from the first end in parallel to the path,
wherein a switching output is switched into an On-state or an Off-state as a function of a sensor signal exceeding or falling below a threshold value,
wherein the first supply voltage connection of each of the plurality of sensors is connected to a supply voltage,
wherein a first sensor of the plurality of sensors is arranged at a beginning of the path and a last sensor of the plurality of sensors is arranged at an end of the path,
wherein a second supply voltage connection of the first sensor of the plurality of sensors is connected to a reference potential, and the first sensor of the plurality of sensors has a power consumption,
wherein the first sensor of the plurality of sensors is always in a switched-on state when the position determining sensor is in operation,
wherein the second supply voltage connection of each further sensor of the plurality of sensors is connected to the switching output of a preceding sensor of the each further sensor of the plurality of sensors,
wherein a respective further sensor of the plurality of sensors is adapted to be switched on or off via the switching output of the preceding sensor,
wherein the respective further sensor of the plurality of sensors has a power consumption in a switched-on state,
wherein the current measuring unit is arranged before the first supply voltage connection of the first sensor of the plurality of sensors or before the second supply voltage connection of the first sensor of the plurality of sensors,
wherein the power consumption of all switched-on sensors contribute to an aggregate current measured via the current measuring unit, and
wherein the aggregate current is a multiple of the power consumption and is proportional to a position of the first end of the transducer.

2. The position determining sensor unit according to claim 1, wherein the On-state of the switching output of each of the plurality of sensors is switched when a first threshold value is exceeded,
wherein the Off-state of the switching output of each of the plurality of sensors is switched when the first threshold value falls short,
wherein the length of the transducer extends from the first end at least up to the first sensor of the plurality of sensors,
wherein a position of the first end of the transducer in a region of the position of the m-th sensor, m being an integer greater than zero, corresponds to an aggregate current:

$$I\text{sum}=(m+1)*I\text{sup, and}$$

wherein Isum is the aggregate current and Isup is the power consumption.

3. The position determining sensor unit according to claim 1, wherein, for increasing the accuracy of the position determination, each of the plurality of sensors has at least a first threshold value and a second threshold value,
wherein the length of the transducer extends from the first end to at least the first sensor of the plurality of sensors,
wherein the second threshold value is less than the first threshold value, wherein the On-state of the switching output of each of the plurality of sensors is switched when the first threshold value is exceeded,
wherein the Off-state of the switching output of each of the plurality of sensors is switched when the second threshold value falls short, wherein the On-state of the switching output of each of the plurality of sensors is pulse-width-modulated for sensor signals lying between the second threshold value and the first threshold value,
wherein a duty cycle of the pulse width modulation is proportional to the sensor signals, wherein the power consumption of a sensor connected to the pulse-width-modulated switching output is proportional to the duty cycle and less than the power consumption in the On-state,
wherein a position of the first end of the transducer in the region of the position Pm of the m-th sensor Sm corresponds to an aggregate current:

$$I\text{sum}=I/I\text{sup}+I\text{pwm, and}$$

wherein Ipwm is a power consumption of a sensor connected to the pulse-width-modulated switching output.

4. The Position determining sensor unit according to claim 1, wherein the Off-state of the switching output of each of the plurality of sensors is switched when a first threshold value is exceeded,
wherein the On-state of the switching output of each of the plurality of sensors is switched when the first threshold value is undershot,
wherein the transducer extends from the first end at least along a partial region of the path in the direction of the last of the plurality of sensors, and
wherein a position of the first end of the transducer in the region of the position of an m-th sensor corresponds to an aggregate current:

$$I\text{sum}=m*I\text{sup.}$$

5. The position determining sensor unit according to claim 1, wherein, in order to increase an accuracy of the position determination, each of the plurality of sensors has at least a first threshold value and a second threshold value,
wherein the transducer extends from the first end at least along a partial region of the path in the direction of the last of the plurality of sensors, wherein the second threshold value is less than the first threshold value, wherein the Off-state of the switching output of each of the plurality of sensors is switched when the first threshold value is exceeded, wherein the On-state of the switching output of each of the plurality of sensors is switched when the second threshold value falls short, wherein the Off-state of the switching output of each of the plurality of sensors is pulse-width-modulated for sensor signals lying between the first threshold value and the second threshold value, wherein a duty cycle of the pulse width modulation is inversely proportional to the sensor signals, wherein the power consumption of a sensor connected to the pulse-width-modulated switching output is proportional to the duty cycle and less than the power consumption in the On-state, and wherein a position of the first end of the transducer in the region of the position of the m-th sensor corresponds to an aggregate current:

$$I\text{sum}=(m-1)*I\text{sup}+I\text{pwm}.$$

6. The position determining sensor unit according to claim 1, wherein the power consumption of the plurality of sensors has a mutual variance of at most 10%.

7. The position determining sensor unit according to claim 1, wherein the power consumption of each of the plurality of sensors is stabilized or trimmed.

8. The position determining sensor unit according to claim 1, wherein the intervals between each of the plurality of sensors are substantially identical.

9. The position determining sensor unit according to claim 1, wherein the first end of the transducer is designed as a tip or as an edge.

10. The position determining sensor unit according to claim 1, wherein a distance of the transducer from a path along the entire length of the transducer is constant or at least increases in the region of the first end.

11. The position determining sensor unit according to claim 1, wherein the plurality of sensors are magnetic field sensors.

12. The position determining sensor unit according to claim 1, wherein the plurality of sensors are Hall sensors with laterally or vertically measuring Hall plates.

13. The position determining sensor unit according to claim 1, wherein the switching output has an open-drain transistor.

14. The position determining sensor unit according to claim 13, wherein a current-carrying capacity of an open-drain output of the open-drain transistor is at least 100 mA.

15. The position determining sensor unit according to claim 13, wherein an input resistance of the open-drain transistor is at most 100 mΩ.

16. The position determining sensor unit according to claim 1, wherein the last sensor of the plurality of sensors is a resistor.

17. The position determining sensor unit according to claim 1, wherein the sensors are capacitive sensors or inductive sensors or temperature sensors or force sensors or pressure sensors.

18. The position determining sensor unit according to claim 1, wherein the plurality of sensors are identical or substantially identical to one another.

* * * * *